US009692680B2

(12) United States Patent
Guo

(10) Patent No.: US 9,692,680 B2
(45) Date of Patent: *Jun. 27, 2017

(54) CENTRALIZED, SCALABLE, RESOURCE MONITORING SYSTEM

(71) Applicant: Groupon, Inc., Chicago, IL (US)

(72) Inventor: Jiaqi Guo, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,535

(22) Filed: Mar. 2, 2016

(65) Prior Publication Data

US 2016/0285731 A1  Sep. 29, 2016

Related U.S. Application Data

(63) Continuation of application No. 13/861,874, filed on Apr. 12, 2013, now Pat. No. 9,304,663.

(51) Int. Cl.
| | |
|---|---|
| *G06F 15/00* | (2006.01) |
| *G06F 13/00* | (2006.01) |
| *H04L 12/26* | (2006.01) |
| *G06F 11/34* | (2006.01) |
| *G06F 3/0482* | (2013.01) |
| *G06F 17/30* | (2006.01) |
| *G06F 11/30* | (2006.01) |
| *G06F 11/32* | (2006.01) |

(52) U.S. Cl.
CPC ............ *H04L 43/10* (2013.01); *G06F 3/0482* (2013.01); *G06F 11/3006* (2013.01); *G06F 11/34* (2013.01); *G06F 11/3409* (2013.01); *G06F 11/3495* (2013.01); *G06F 17/30864* (2013.01); *G06F 11/324* (2013.01)

(58) Field of Classification Search
CPC ... G06F 9/5055; G06F 11/3672; G06F 3/0484
USPC .................. 715/763–765, 851–854, 733, 736
See application file for complete search history.

(56) References Cited

U.S. PATENT DOCUMENTS

| | | | |
|---|---|---|---|
| 7,100,195 B1 | 8/2006 | Underwood | |
| 2003/0120776 A1* | 6/2003 | Avvari | G06F 9/5055 709/225 |
| 2013/0152047 A1* | 6/2013 | Moorthi | G06F 11/368 717/124 |

OTHER PUBLICATIONS

Office Action for U.S. Appl. No. 13/861,874 dated Mar. 27, 2015, 10 pages.

* cited by examiner

*Primary Examiner* — Kevin Nguyen
(74) *Attorney, Agent, or Firm* — Alston & Bird LLP

(57) ABSTRACT

A method, apparatus, and computer program product are disclosed to provide host-independent resource monitoring for distributed networks. The method includes determining, from a set of jobs, one or more jobs to execute that monitor the status of resources within a distributed network. The method determines one or more environments in which to run the one or more jobs, and instantiates the one or more jobs with one or more environment variables for the determined one or more environments such that the one or more jobs are configured for operation in the determined one or more environments. The method accordingly displays, using a graphical user interface, a job environment matrix including a list of the set of jobs in conjunction with a running status of each of the jobs in each of one or more environments. A corresponding apparatus and computer program product are also provided.

20 Claims, 15 Drawing Sheets

Job CountStuckAutomations details

Basic job information

*Job name:* CountStuckAutomations

*Job Id:* Jk4plELzCe32oVFtmokIng

*Description:* Count automations stuck in unprocessed and processing states

*Created by:* fixme

*Network:* SNC1

*Execution schedule:* 3-59/10 * * * *

SQL collector information

*Database Url:* jdbc:mysql://${CampaignDbHost}/arrowhead

*Database Driver:* com.mysql.jdbc.Driver

*Login/password:* arrowhead / arrowhead

*SQL query:*
```
SELECT COUNT(*)
    FROM automation_definition
    WHERE status IN ('unprocessed', 'processing')
```

*Required variables:* ${CampaignDbHost}

Job CountStuckAutomations actions

- Job details
- Edit job details

FIG. 8

Edit environment Production

Environment Id: SEPzVFBs0wFC6J61CdtymA

Environment Name: Production

Description: Against prod hosts

🖫 Save changes

Modify variables

| Select | Variable name | | Variable value |
|---|---|---|---|
| ◌ | ${CampaignDbHost} | = | 10.20.43.150 |

Add new variables

| 1 | ${ Variable name } | = | Variable value |
| 2 | ${ Variable name } | = | Variable value |
| 3 | ${ Variable name } | = | Variable value |
| 4 | ${ Variable name } | = | Variable value |

🖫 Save changes    ✖ Delete selected

Environment Production actions
- 🗐 Environment details
- ✎ Edit environment details

FIG. 10

Dashboard

| Environment | Job | Status |
|---|---|---|
| Production | CountStuckAutomations | RUNNING |
| Result 0 collected 6 minutes ago . Next check will occur 3 minutes from now | | |
| Production | CountValidatingCampaigns | RUNNING |
| Result 0 collected 10 minutes ago . Next check will occur 4 minutes from now | | |
| Production | CountWaitingCampaigns | RUNNING |
| Result 3 collected 12 minutes ago . Next check will occur 2 minutes from now | | |
| UAT | CountFailedAutomations | RUNNING |
| Result 3 collected 7 minutes ago . Next check will occur 7 minutes from now | | |
| UAT | CountInflightAutomations | RUNNING |
| Result 15 collected 38 minutes ago . Next check will occur 6 minutes from now | | |
| UAT | CountStuckAutomations | RUNNING |
| Result 13 collected 6 minutes ago . Next check will occur 3 minutes from now | | |
| UAT | CountValidatingCampaigns | RUNNING |
| Result 1 collected 10 minutes ago . Next check will occur 4 minutes from now | | |
| UAT | CountWaitingCampaigns | RUNNING |
| Result 10 collected 12 minutes ago . Next check will occur 2 minutes from now | | |

Environments

- Production - Against prod hosts
- UAT - Against UAT hosts

Jobs

- BadDatabaseUrl - Designed to fail
- CountFailedAutomations - Count automations in status schedule_error
- CountInflightAutomations - Count automations in processing, stopping and resuming states
- CountStuckAutomations - Count automations stuck in unprocessed and processing states
- CountValidatingCampaigns - Count number of campaigns in validating status
- CountWaitingCampaigns - Number of campaigns in waiting status

Domain actions of Arrowhead

- Dashboard
- Users and permission
- Edit domain detail
- Control panel
- Create new job
- Create new environment

FIG. 11

CENTRALIZED, SCALABLE, RESOURCE MONITORING SYSTEM

CROSS REFERENCE TO RELATED APPLICATIONS

This application is a continuation of U.S. patent application Ser. No. 13/861,874, filed Apr. 12, 2013, the entire disclosure of which is incorporated by reference herein for all purposes.

TECHNOLOGICAL FIELD

Example embodiments of the present invention relate generally to monitoring resources in distributed network and, more particularly, to a method and apparatus for centralized and scalable monitoring of a resource.

BACKGROUND

Applicant has discovered problems with current methods for monitoring remote resources in scalable computer networks. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided that enable host-independent resource monitoring for distributed networks.

In a first example embodiment, an apparatus is provided. The apparatus may include a processor and a memory, the memory storing computer program code that, when executed by the processor, causes the apparatus to determine, from a set of jobs, one or more jobs to execute, wherein the one or more jobs are configured to monitor the status of resources within a distributed network. The computer program code, when executed by the processor, further causes the apparatus to determine one or more environments in which to run the one or more jobs, wherein the one or more environments are defined using one or more environment variables, and instantiate the one or more jobs with the one or more environment variables for the determined one or more environments such that the one or more jobs are configured for operation in the determined one or more environments. In addition, the computer program code, when executed by the processor, further causes the apparatus to display, using a graphical user interface, a job environment matrix including a list of the set of jobs in conjunction with a running status of each of the jobs in each of one or more environments.

In one embodiment, the computer program code, when executed by the processor, further causes the apparatus to receive, using the graphical user interface, instructions to run, stop, suspend running of, or resume running an instance of a job displayed in the job environment matrix in an environment displayed in the job environment matrix, and start, stop, suspend, or resume an instance of the job based on the received instructions.

In another embodiment, the computer program code, when executed by the processor, further causes the apparatus to, display, using the graphical user interface, a job creation interface, receive, using the graphical user interface, abstract job parameters, create a new job based on the received abstract job parameters, and store the new job in the memory. In this regard, the abstract job parameters may include an execution schedule of the job and a collector that performs resource monitoring operations. In one such embodiment, the computer program code, when executed by the processor, further causes the apparatus to, display, using the graphical user interface, a job editing interface, wherein the job editing interface displays abstract job parameters of a selected job, receive, using the graphical user interface, instructions for updating the abstract job parameters of the selected job, update the selected job based on the received instructions, and store the updated job in the memory.

In yet another embodiment, the computer program code, when executed by the processor, further causes the apparatus to display, using the graphical user interface, an environment creation interface, receive, using the graphical user interface, an environment variable, create a new environment based on the received environment variable, and store the new environment in the memory. In this regard, the environment variable comprises a network address. In one such embodiment, the computer program code, when executed by the processor, further causes the apparatus to, display, using the graphical user interface, an environment editing interface, wherein the environment editing interface displays parameters of a selected environment, receive, using the graphical user interface, instructions for updating the parameters of the selected environment, update the selected environment based on the received instructions, and store the updated environment in the memory.

In one embodiment, the computer program code, when executed by the processor, further causes the apparatus to display, using the graphical user interface, a summary of running jobs in conjunction with a status of each of the running jobs.

In another embodiment, the memory stores a domain having a list of jobs, a list of environments, and permissions information, wherein the permissions information indicates a list of users who may access the domain and access levels of the list of users. In this regard, the computer program code, when executed by the processor, further causes the apparatus to display, using the graphical user interface, a domain editing interface, wherein the domain editing interface displays the list of jobs and the list of environments of the domain, receive, using the graphical user interface, instructions for updating the list of jobs or the list of environments, update the domain based on the instructions, and store the updated domain in the memory. In another such embodiment, the computer program code, when executed by the processor, further causes the apparatus to display, using the graphical user interface, a permissions editing interface, wherein the permissions editing interface displays the list of users who may access the domain and access levels of each user of the list of users, receive, using the graphical user interface, instructions for updating the list of users or the access levels of each user of the list of users, update the domain based on the instructions, and store the updated domain in the memory.

In a second example embodiment, a method is provided. The method includes determining, from a set of jobs, one or more jobs to execute, wherein the one or more jobs are configured to monitor the status of resources within a distributed network. The method further includes determining one or more environments in which to run the one or more jobs, wherein the one or more environments are defined using one or more environment variables, and instantiating, using a processor, the one or more jobs with the one or more environment variables for the determined one or more environments such that the one or more jobs are configured for operation in the determined one or more environments. The method additionally includes displaying, using a graphical user interface, a job environment matrix including a list of the set of jobs in conjunction with a running status of each of the jobs in each of one or more environments.

In a third example embodiment, a computer program product is provided. The computer program product includes a computer-readable storage medium storing computer program code that, when executed by an apparatus, causes the apparatus to determine, from a set of jobs, one or more jobs to execute, wherein the one or more jobs are configured to monitor the status of resources within a distributed network. The computer program code, when executed by the processor, further causes the apparatus to determine one or more environments in which to run the one or more jobs, wherein the one or more environments are defined using one or more environment variables and instantiate the one or more jobs with the one or more environment variables for the determined one or more environments such that the one or more jobs are configured for operation in the determined one or more environments. The computer program code, when executed by the processor, also causes the apparatus to display, using a graphical user interface, a job environment matrix including a list of the set of jobs in conjunction with a running status of each of the jobs in each of one or more environments.

In a fourth example embodiment, an apparatus is provided. The apparatus includes means for determining, from a set of jobs, one or more jobs to execute, wherein the one or more jobs are configured to monitor the status of resources within a distributed network. The apparatus further includes means for determining one or more environments in which to run the one or more jobs, wherein the one or more environments are defined using one or more environment variables, and means for instantiating, using a processor, the one or more jobs with the one or more environment variables for the determined one or more environments such that the one or more jobs are configured for operation in the determined one or more environments. The apparatus additionally includes means for displaying, using a graphical user interface, a job environment matrix including a list of the set of jobs in conjunction with a running status of each of the jobs in each of one or more environments.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
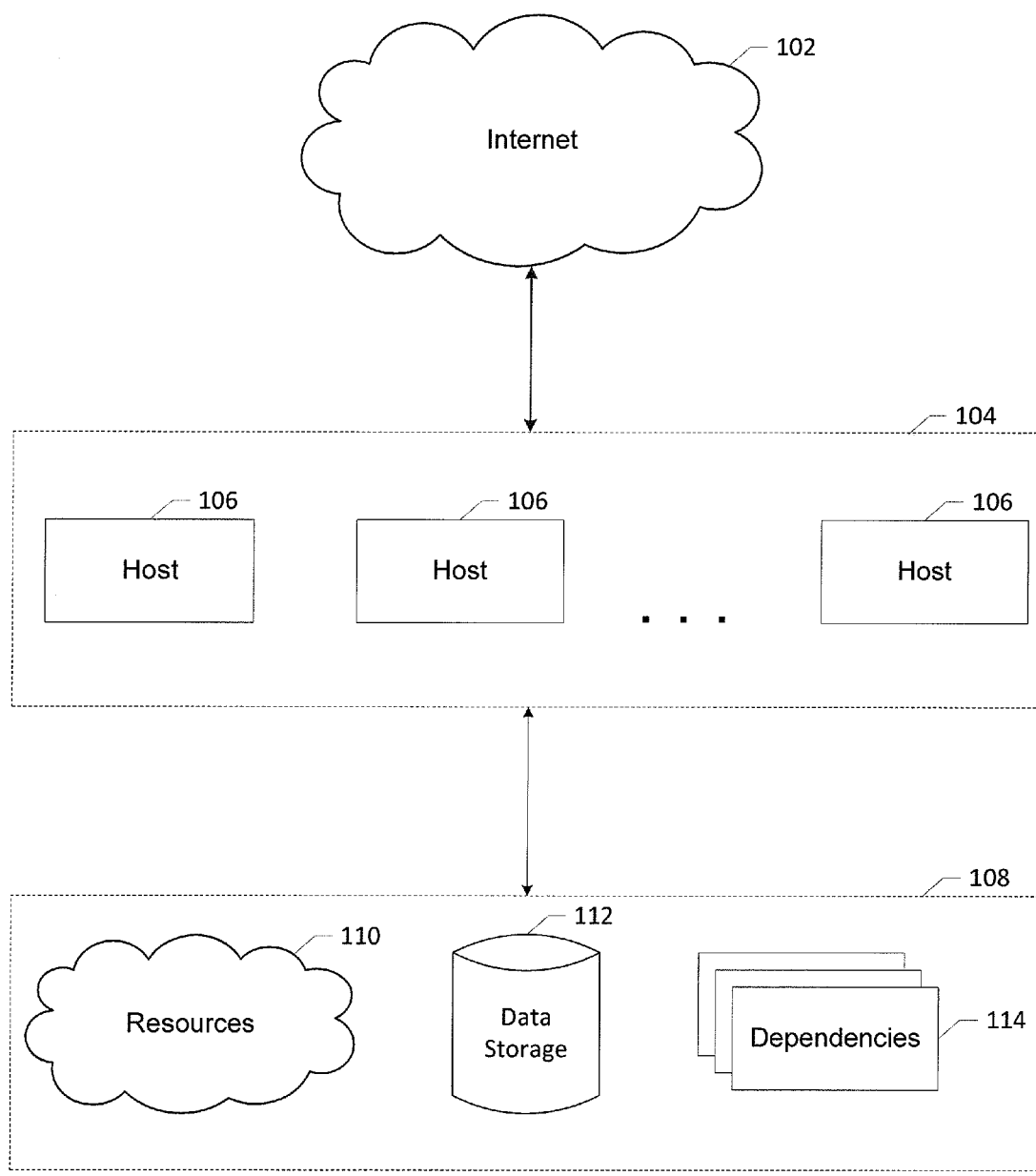
Figure 2:
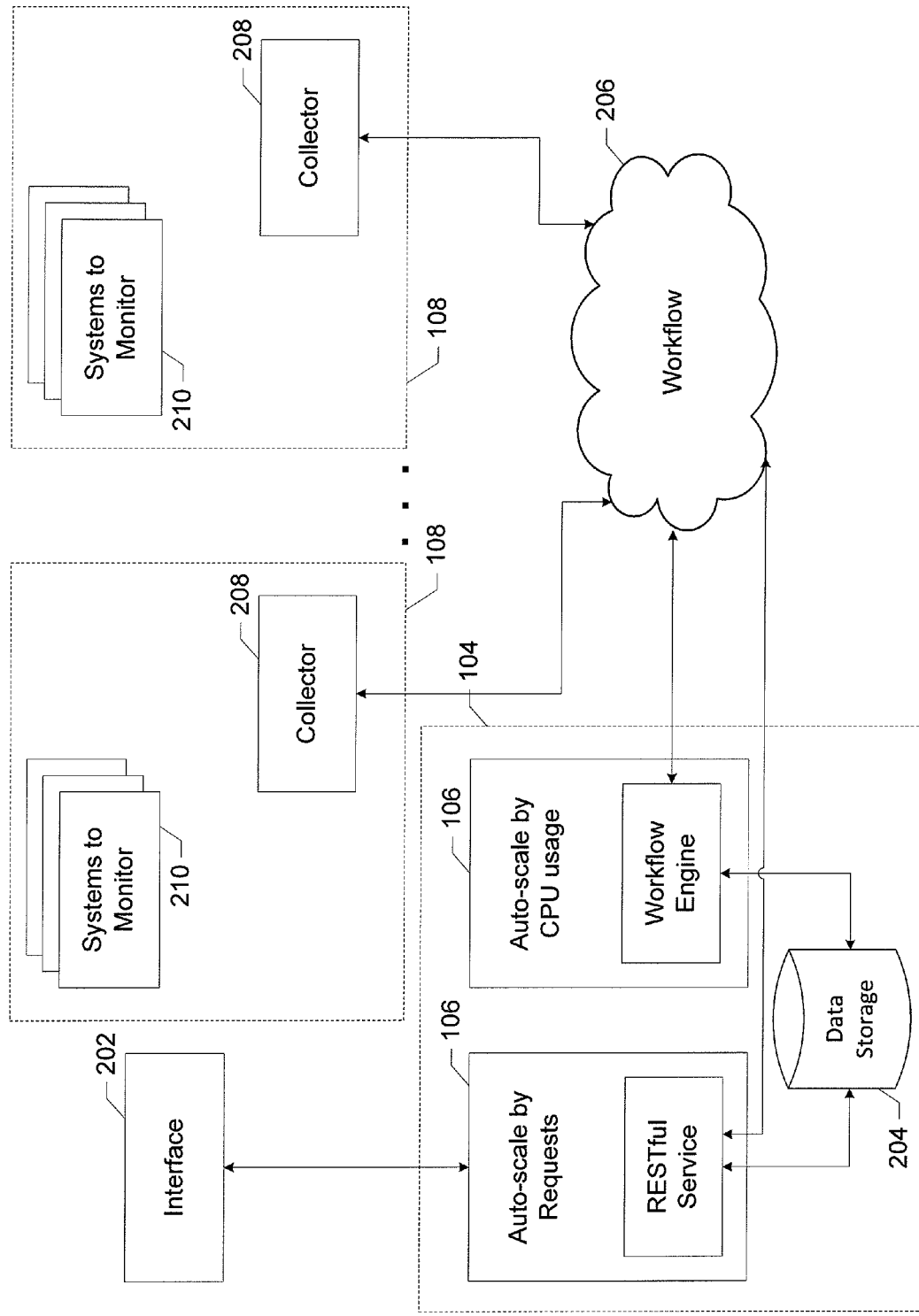
Figure 3:
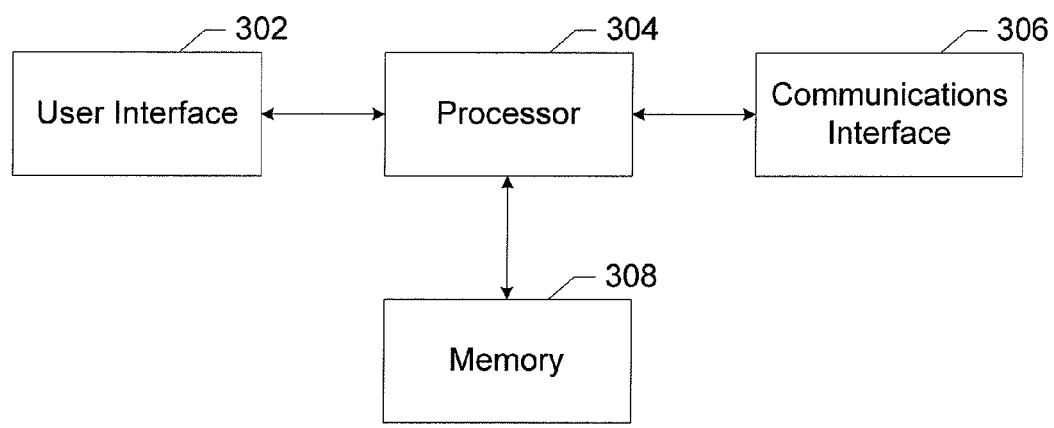
Figure 4:
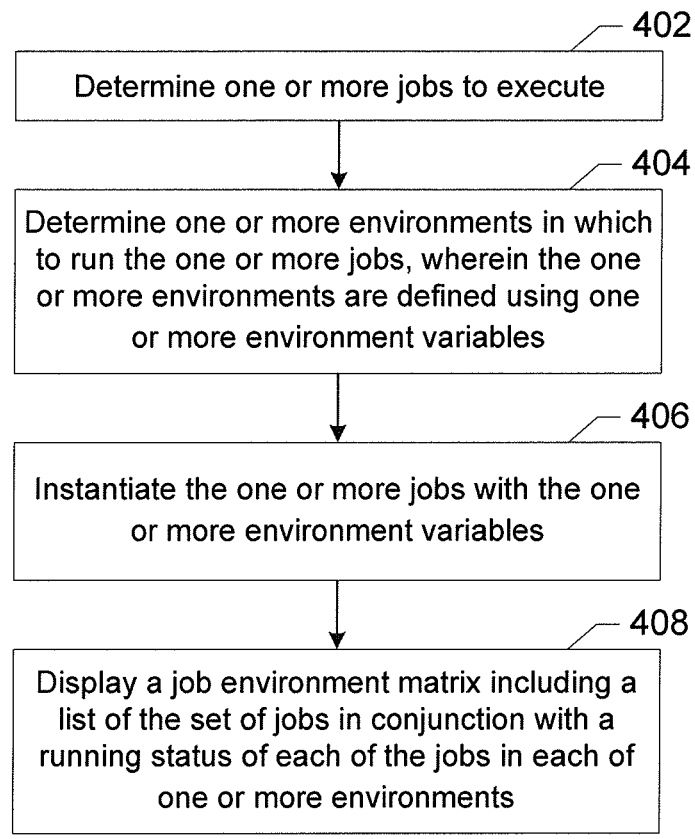
Figure 5:
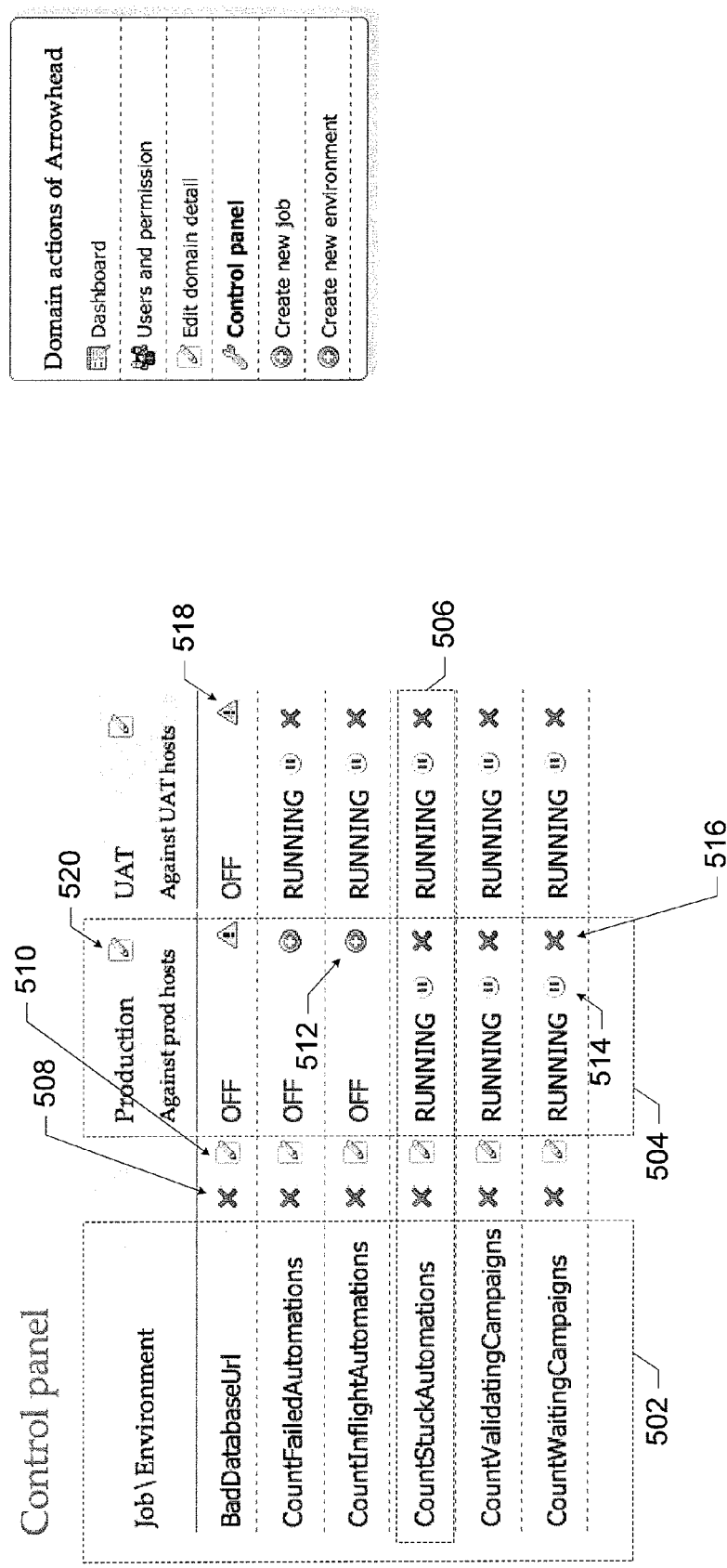
Figure 6:
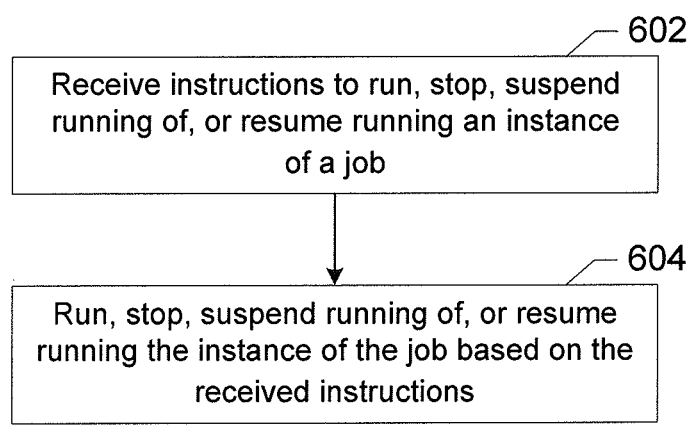
Figure 7A:
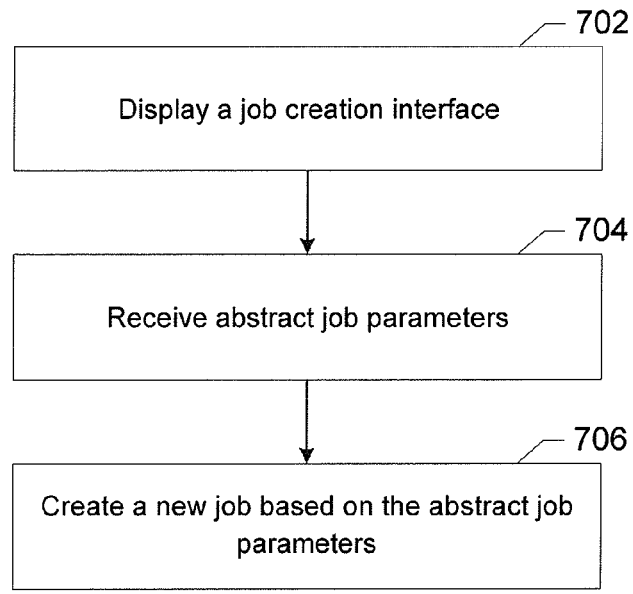
Figure 7B:
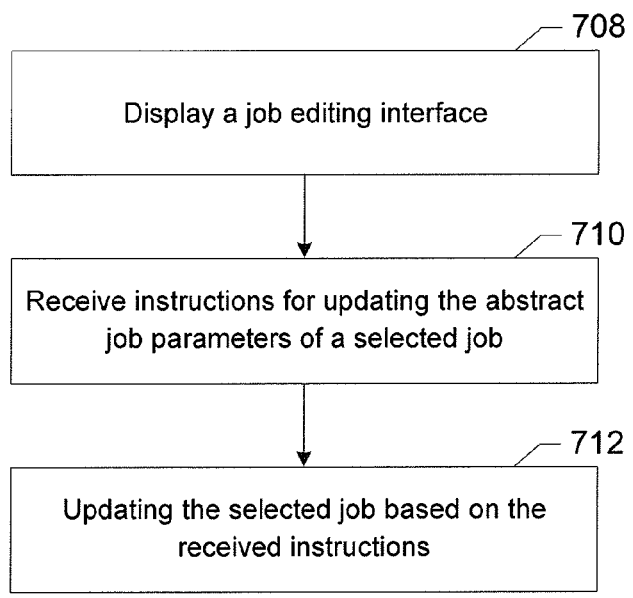
Figure 9A:
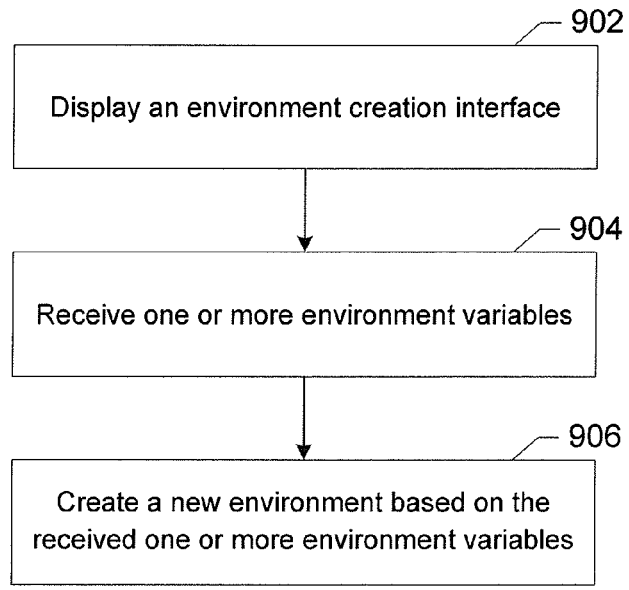
Figure 9B:
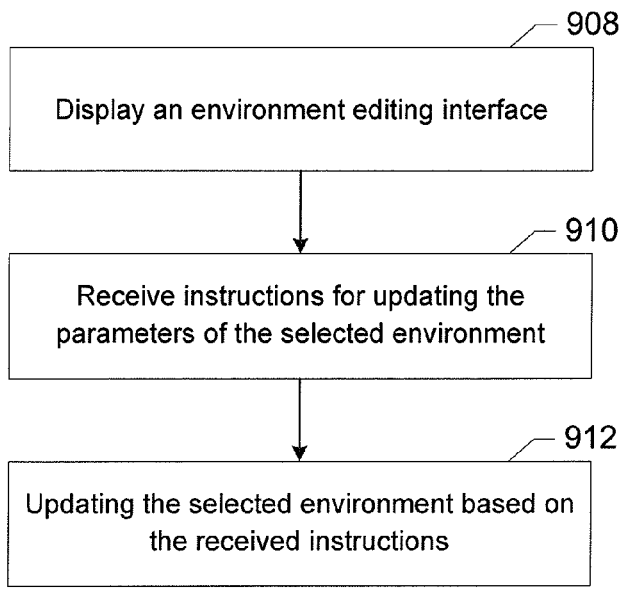
Figure 12:
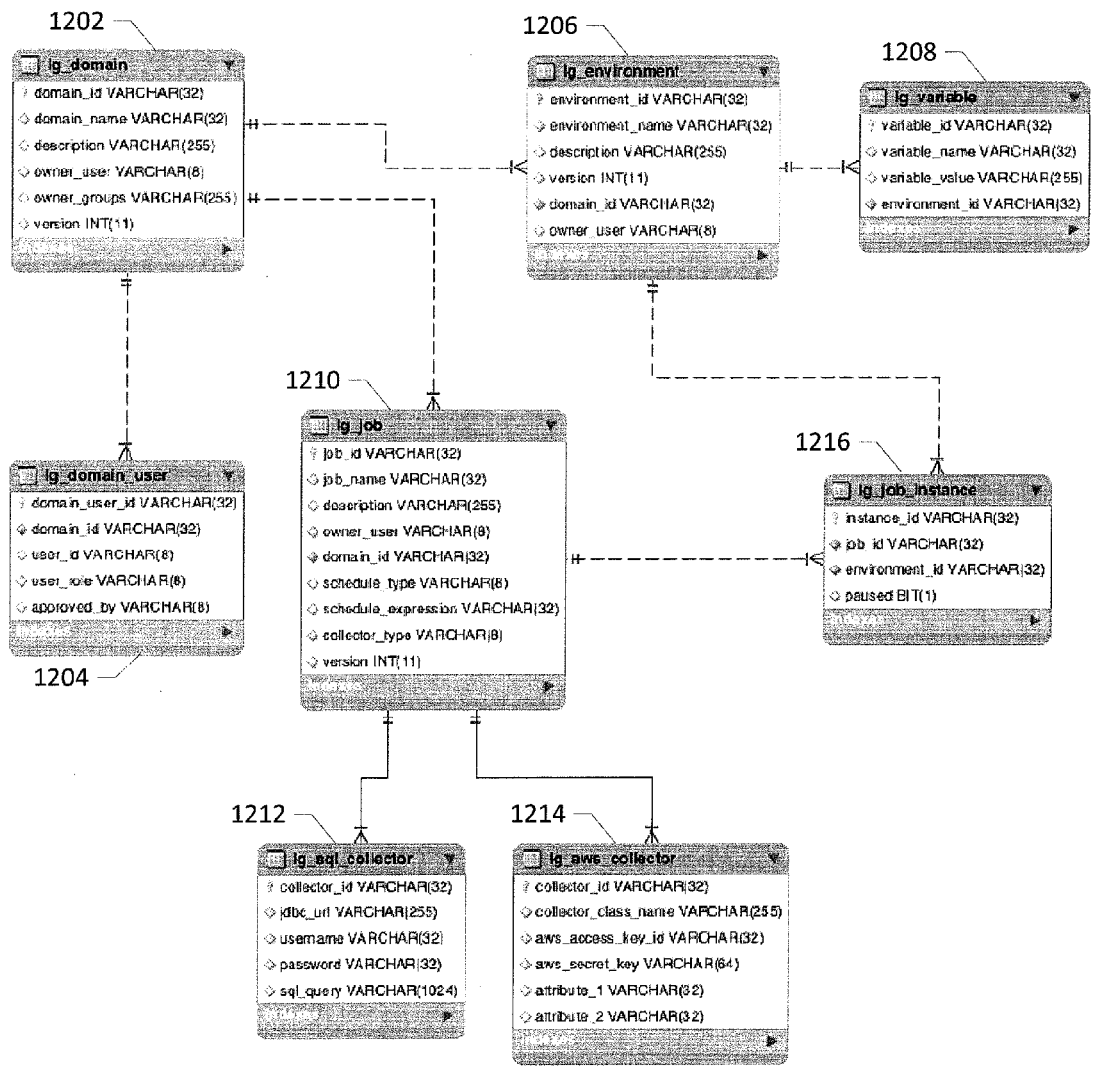
Figure 13A:
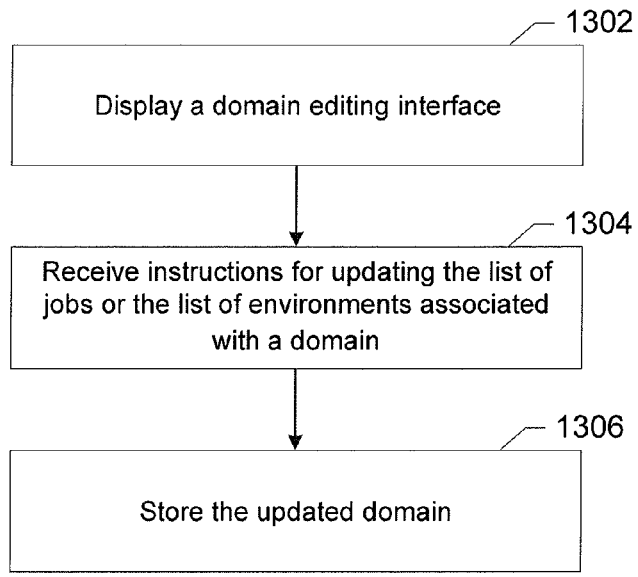
Figure 13B:
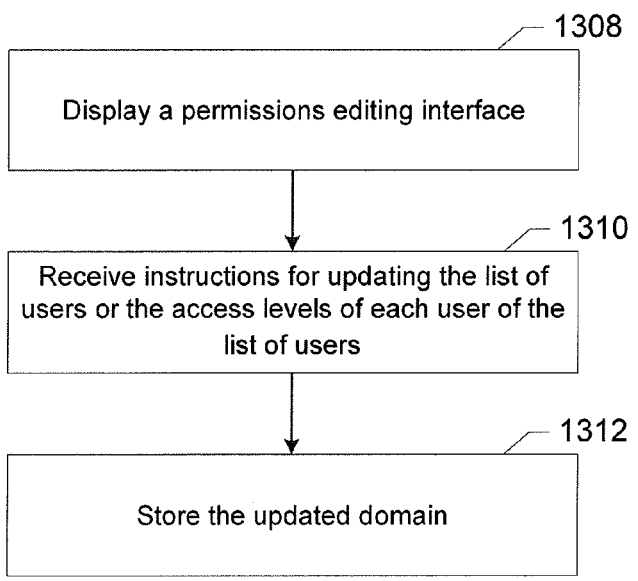
Figure 14:
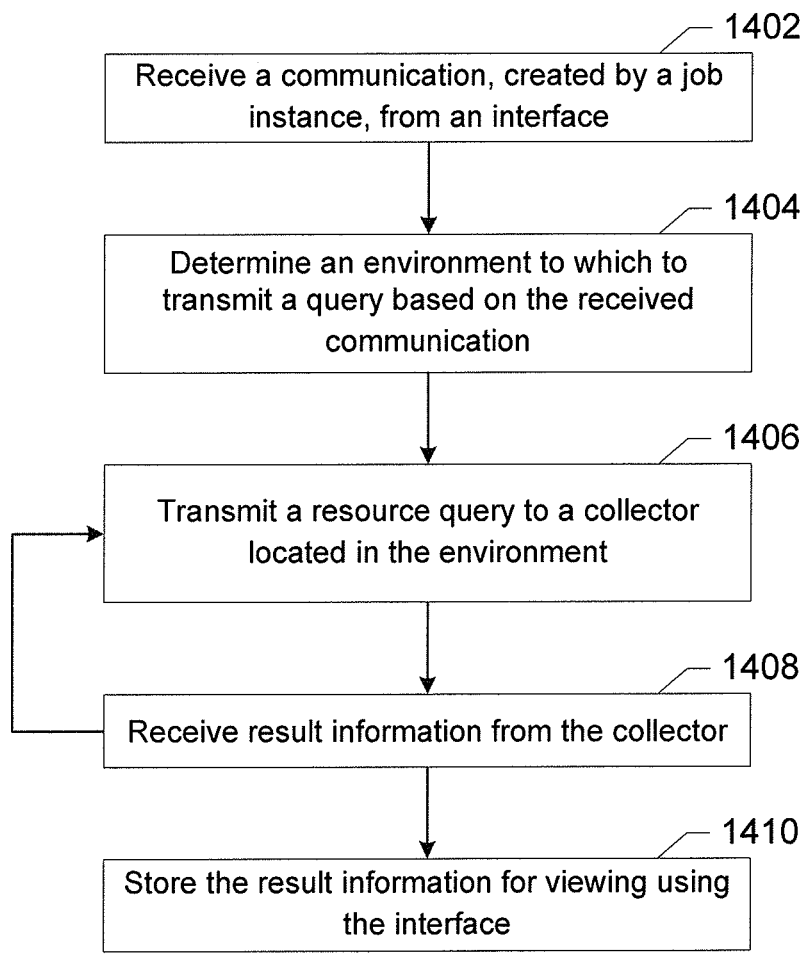
Figure 15:
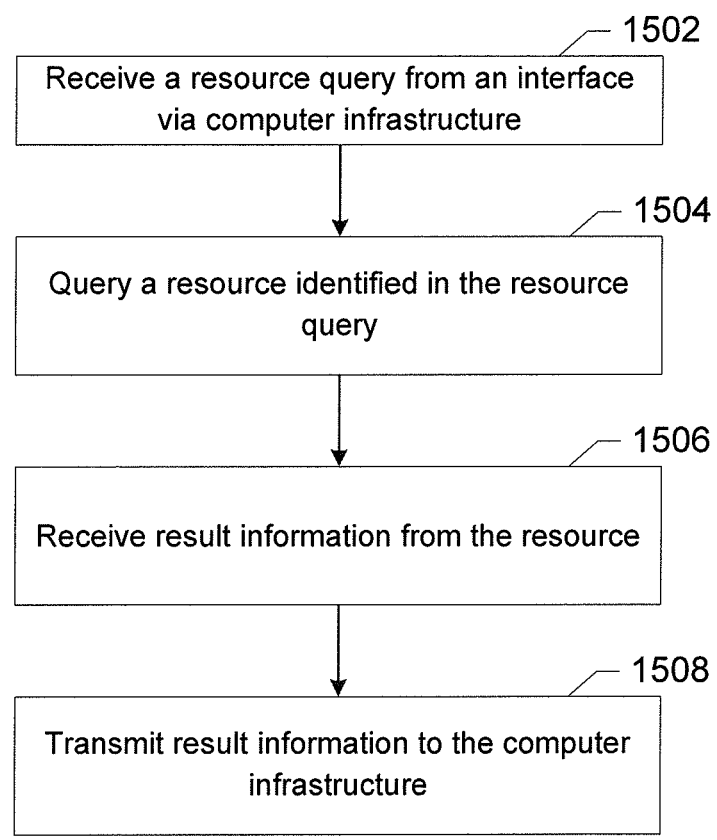

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example system, in accordance with some example embodiments of the present invention;

FIG. 3 shows a block diagram of an apparatus that may be specifically configured in accordance with an example embodiment of the present invention;

FIG. 4 illustrates a flowchart describing example operations for managing one or more monitoring jobs in a distributed network in accordance with some example embodiments;

FIG. 5 illustrates an example job environment matrix in accordance with some example embodiments;

FIG. 6 illustrates a flowchart describing example operations for receiving monitoring instructions using a web user interface in accordance with some example embodiments;

FIGS. 7a and 7b illustrate flowcharts describing example operations for creating and editing jobs, in accordance with some example embodiments;

FIG. 8 illustrates a job details interface in accordance with some example embodiments;

FIGS. 9a and 9b illustrate flowcharts describing example operations for creating and editing environments, in accordance with some example embodiments;

FIG. 10 illustrates an environment editing interface in accordance with some example embodiments;

FIG. 11 illustrates an example dashboard overview in accordance with some example embodiments;

FIG. 12 illustrates a data model of one example domain in accordance with some example embodiments;

FIGS. 13a and 13b illustrate flowcharts describing example operations for editing attributes of a domain in accordance with some example embodiments;

FIG. 14 illustrates a flowchart describing example operations for managing one or more monitoring jobs in a distributed network from the perspective of a host in accordance with some example embodiments; and FIG. 15 illustrates a flowchart describing example operations for managing one or more monitoring jobs from the perspective of a collector within a resource environment in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Overview

A method, apparatus, and computer program product are provided in accordance with an example embodiment of the present invention in order to facilitate improved resource monitoring in a scalable computing environment.

Historically, a common issue in deploying infrastructure capacity to support a computer-based application is that the infrastructure necessary to ensure operation and stability of the application is not static, but can vary significantly; during times of peak user traffic, the required capacity can be significantly higher than during times of low user traffic. However, deploying infrastructure sufficient to handle the peak user traffic creates some degree of waste, as some amount of infrastructure may sit idle during non-peak time periods. Alternatively, deploying any capacity less than this amount may result in a poor user experience during peak user traffic. Accordingly, to eliminate this potential for waste and/or insufficient infrastructure capacity, computer infrastructure is often scalable, such that the number of hosts can be changed dynamically to address user traffic load in real-time. In this regard, a host may comprise a computing system in a computing network that is configured to perform network control functions and to provide computational and/or database access to one or more computing systems or users in the computing network.

As a side effect, however, introducing scalability into a computing environment may add complexity to resource monitoring. A resource may comprise any data processing component that may perform a job or task, and may include, but not limited to, databases, other types of storage, input/output devices, processing units, data files, and programs. Resources may often be monitored for availability, database connectivity, connection time, service availability, response time, order drops, or service calls returning unexpected values (e.g., SELECT COUNT(*) FROM business_objects WHERE state='stuck' returns non-zero). Typically, resource monitors run in the computer infrastructure on hosts that create the connection between users and a resource (e.g., a database). In a scalable environment, though, a resource monitor may only be operational when residing on an actively employed host, so there may be low traffic situations when a given host is not used, and therefore when the resource monitor residing on that host is not operating. To surmount this problem, resource monitors may be installed on every possible host in the scalable system, but another problem is created in this instance: when resource monitors reside on every possible host, then the resource monitors themselves may burden the system with duplicative operations.

To surmount this duplicative monitoring problem, resource monitors may run on every host, but with additional software establishing a leader election between the active hosts. Using leader election software, each of the active hosts may communicate with each other to determine which host will monitor a particular resource at a given time. However, although developing software to perform leader election among active hosts may be possible, it would require robust communication between the various hosts, and therefore the software must be developed specifically for each set of hosts in which the leader election software would run. Accordingly, even if this is technically possible, because leader election would need to be specifically implemented for each set of hosts, leader election may not be practical for large-scale implementations in which there are many separate sets of hosts. Instead of patching a system with one script after another, it makes sense for a solution generated independently from any particular implementation or workflow to be monitored. Thus, another solution is required that avoids the need to develop leader election software and which allows user to continue to add monitors via a web user interface.

As a system grows, it becomes important for engineers to be able to easily define monitoring jobs (e.g., a SQL query or the like) and run them with specified schedules, collect results, create alarms, and all without the burden of specifically coding, building or deploying distinct software implementations. It's also important for a system to execute monitor jobs based on a strictly defined schedule regardless of how the system scales up and down.

Embodiments of the present invention provide a centralized monitoring system that implements monitors and alarms around shared resources such as databases and related services by repeatedly running user-defined jobs. In this regard, rather than having resource monitors running on one or more hosts in the scalable network and pushing data to an end-user responsible for resource management, in some example embodiments of the present invention, a resource monitor may reside outside of the hosts, and may be developed to pull relevant information from the resource itself via the set of hosts. As described in greater detail below, resources may be thus be monitored without consideration of the scalability of the network, the number of hosts, or any other issues related to the specific computer infrastructure using which the resource is accessed.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Users may access an environment 108 (which may include cloud resources 110, data storage resources 112, and/or other dependencies 114) from the Internet 102 (or another computational network) via computer infrastructure 104 (i.e., middleware). As noted, an environment 108 may include components, but may further be understood as having a distinct network address reachable from the Internet 102. Furthermore, infrastructure 104 may comprise a single host system, multiple hosts, or may be a scalable infrastructure that could comprise a variable number of hosts 106. As described above, traditional resource monitoring applications are stored on and run from this computer infrastructure 104.

By contrast, embodiments of the present invention may run outside of the scalable elements of a system, such as, for example, on an end-user device. FIG. 2 illustrates this fact with a block diagram showing another example system of the present invention. As can be seen, an interface 202 (e.g., a web user interface, a mobile application, a client device, a kiosk, etc.) comprises the resource monitoring application that a user may use to enable host-independent monitoring of a scalable computer network. The interface 202 is configured to enable a user may use to create jobs, environments, define execution schedules, and start, stop, suspend, or resume individual job instances.

As further shown in FIG. 2, the interface 202 is in data communication with computer infrastructure 104 (i.e., middleware) including one or more hosts 106. In this example, the hosts 106 may comprise one or more RESTful service hosts (e.g., implemented using HTML and representational state transfer (REST) principles) and one or more workflow engine hosts, as well as specific resources, such as data store 204. In some examples, the RESTful service is the component that handles user traffic from the interface 202 (and potentially other systems that integrate with the system), and automatically scales based on the number of users interacting with computer infrastructure 104. The RESTful service, in some such examples, is configured to call or otherwise access remote resources like data store 204 and the one or more workflow engine hosts. In one example, the RESTful service is implemented using a JAXRS (Java API for RESTful services) interface, wherein the JAXRS interface may be shared between the interface 202, the RESTful service and other elements that may integrate with the system. The workflow engine includes decision workers and activity workers that call the workflow engine and perform actions against the system database. The workflow engine hosts output job results into a log file which eventually is displayed as a graph. The workflow engine is the component of computer infrastructure 104 that handles backend requests and, accordingly, automatically scales not based on user requests, but based upon the number of jobs to be performed (e.g., CPU usage). In some embodiments, the interface 202, the RESTful service and the workflow engine may reside in a single Java virtual machine (JVM). Of course, in other embodiments, the computer infrastructure middleware 104 may be implemented using other technology and may or may not be scalable. One benefit of embodiments of the present invention is that no specific computer middleware infrastructure is required to monitor resources.

When a resource monitoring job is instantiated by the interface 202 (e.g., such as is described below in connection with FIG. 4), a resource monitoring request is communicated to computer infrastructure 104 according to an execution schedule (e.g., every 5 minutes) and managed in conjunction with other pending requests according to a workflow 206 that organizes processing resources in a distributed network. In this regard, individual requests are passed to a collector 208 in an environment 108 (and there is a one to one correspondence between each job instance and a particular collector 208). Of course, there may be a different environment 108 for each resource that is monitored. For each such resource being monitored, the respective collector 208 gathers relevant resource information from the resource (e.g., system to monitor) 210. Subsequently, the gathered information is returned via the computer infrastructure 104 for eventual presentation to the user via interface 202. Of course, to properly enable monitoring of resources, each environment 108 may be configured to store source code enabling operation of respective collector 208.

Regardless of the type of device within which the interface 202 resides, an apparatus 300 that may be specifically configured to facilitate improved resource monitoring in a scalable computing environment in accordance with an example embodiment of the present invention is illustrated in FIG. 3. It should be noted that while FIG. 3 illustrates one example configuration of an apparatus that may run the interface 202, numerous other configurations may also be used to implement embodiments of the present invention (for instance, in examples described herein, the apparatus 300 may show an example configuration of a host within computer infrastructure 104 or a collector within an environment 108). As such, in some embodiments, although elements are shown as being in communication with each other, hereinafter such elements should be considered to be capable of being embodied within the same device or within separate devices.

Referring now to FIG. 3, the apparatus 300 may include or otherwise be in communication with a processor 304, a memory 308, a communication interface 306, and a user interface 302. In some embodiments, the processor (and/or co-processor or any other processing circuitry assisting or otherwise associated with the processor) may be in communication with the memory device via a bus for passing information among components of the apparatus. The memory 308 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 304 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 304 may be configured to execute instructions stored in the memory 308 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

Meanwhile, the communication interface 306 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 300 may include a user interface 302 that may, in turn, be in communication with processor 304 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 308, and/or the like).

Job Abstraction

One aspect that in some examples enables greater practicality of embodiments of the present invention is the concept of job abstraction. A job defines the action to be performed and an execution schedule to monitor a resource. In a job, the execution schedule defines when the job runs and the collector defines what action a job performs. As abstracted, when a job is defined, it can be defined with a ${variable} expression which will later be replaced by environment variable values defined in environments at the time the job runs. By generalizing the definition of a monitoring job, instances of the job can be quickly created and deployed to a variety of resource environments so that a user is spared the cumbersome process of manually coding each desired job. In this regard, while an abstraction may be referred to as a job, a job instance is an actual implementation of a job running in a particular environment.

In this respect, an environment is the context in which a job runs. An environment can define one or more environment variables (e.g., host name or IP address of a database, URL fragment or the like) that can be used in conjunction with the job definition to create a job instance that runs in the environment. Upon creation of a domain, a "Production" environment is additionally created by default. If a job definition contains the expression ${variableName}, the expression will be replaced by variable values defined in the environment within which the job is intended to run. In some examples, if a job requires a set of variables, it can only run in an environment that defines all of the required variables. Accordingly, using job abstractions in conjunction with environment variables helps user define a set of jobs and run them in multiple environments, such as user acceptance testing (UAT) and/or production environments.

Accordingly, a user may turn on and off, or suspend or resume a job instance via an interface, such as interface 202. In an instance in which a job instance is started, the computer infrastructure 104 may begin a workflow execution for the job that continues until the job instance is stopped. For example, although traditional resource monitoring software must be designed from the ground up for each resource to be monitored, once an abstraction of a resource is created using embodiments of the present invention, each implementation of the abstraction merely requires its combination with environment-specific variables to create an instance of the job that will monitor a specific resource.

Interface Operations

Embodiments of the present invention may be implemented using interface 202, which, as previously described, may in one example embodiment comprise a web user interface. In this regard, the interface 202 may include a graphical user interface that enables a user, another computing device connected to the interface 202, or the like, to create monitoring jobs and environments within which to run, visually identify created jobs and see their running states in a variety of environments, and may also enable a user to, in substantially real-time, start, suspend, resume, or stop an instance of a job. Moreover, the interface 202 allows or otherwise enables the creation and editing of domains that identify covered jobs and environments, define an authorized list of users who have access to the covered jobs and environments, and establishes specific access rights for each authorized user.

Accordingly, FIG. 4 illustrates a flowchart containing example operations for managing one or more monitoring jobs in a distributed network. The operations illustrated in FIG. 4 may, for example, be performed by, with the assistance of, and/or under the control of one or more of apparatus 300, and may use processor 304, memory 308, user interface 302, and communications interface 306. In operation 402, apparatus 300 includes means, such as user interface 302, processor 304 or the like, for determining one or more jobs to execute. In this regard, the determination of jobs to execute may be made based on an execution schedule for each specific job. However, as detailed below, the determination of jobs to execute may be made by a user via a user interface 302 by manipulating the interface 202.

In operation 404, the apparatus 300 further includes means, such as user interface 302, processor 304, communications interface 306, memory 308, or the like, for determining one or more environments in which to run the one or more jobs. As with the determination of jobs to execute, the determination of environments may be made based on an execution schedule for each specific job or by a user via a user interface 302.

In operation 406, the apparatus 300 may include means, such as processor 304, communications interface 306, or the like, for instantiating the one or more jobs with the one or more environment variables. Because each job comprises an abstraction that requires specific environment variables for execution, instantiation of a job includes identification, by the apparatus 300, of environment variables necessary for execution of an instance of the job. Moreover, upon instantiating a job, the apparatus 300 may further include means, such as communications interface 306 or the like, for communicating with, via the scalable computer infrastructure, the resource identified by the job. In this regard, a resource monitor may run an SQL SELECT query against a database every 5 minutes and trigger an alarm when a predefined threshold is breached, may call a workflow service every 5 minutes to query the number of backlog and accordingly trigger an alarm when the backlog size breaches the threshold, or may call a workflow service every 5 minutes to query the number of workflow executions of given type. Alternatively, a resource monitor may be called to perform math calculations of multiple other job results, such as calculating workflow execution number minus the result of a SELECT query, or trigger an alarm when the result breaches the threshold. Furthermore, result information received as a result of running a job instance may be communicated back via the computer infrastructure 104 and interface 202. In one such embodiment, the method of communication upon receipt of the result information by interface 202 may be configurable. In one example, users may wish to receive all result information updates via designated communication format (e.g., email message, text message, etc.). In one such example, users may elect to only receive notifications upon a threshold breach. For example, for the SQL query SELECT COUNT(*) FROM transactions WHERE status='stuck', a user may receive an email message in an instance the query returns a value greater than zero.

In operation 408, the apparatus 300 may include means, such as user interface 302, communications interface 306, or the like, for displaying a job environment matrix including a list of the set of jobs in conjunction with a running status of each of the jobs in each of the one or more environments. In this regard, as previously described, the user defines jobs and environments, where a job can be defined with $ expressions and an environment defines the value of the environment variables that will be automatically inserted in place of the $ expressions. At runtime, a combination of job/environment constitute actual job instance to run.

For example, a CountStuckTransactions SQL job may be defined as:

Database URL: jdbc:mysql://${databasehost}/transactiondb

Database Login: dbuser/dbpassword

Connection timeout: 500 ms

Query timeout: 200 ms

SQL query: SELECT COUNT(*) FROM transactions WHERE status='stuck'

Execution Schedule: Every 10 minutes

In this example, the environment "PROD" is defined with variable: databasehost=actual-prod-database.groupondev.com and the environment "UAT" is defined with variable: databasehost=actual-uat-database.groupondev.com.

Accordingly, a generic interface 202 accordingly may display a job environment matrix, such as shown in Table 1.

TABLE 1

| Job | PROD | UAT |
| --- | --- | --- |
| CountStuckTransactions | Turn On/Off | Turn On/Off |
| AnotherJob | Turn On/Off | Turn On/Off |

When a job instance is turned on from control panel, the system combines the job and environment into a workflow execution instance with all $ expressions replaced by variables in the relevant environment.

By way of further example, a user may want to run a SQL query like "SELECT COUNT(*) FROM my_objects WHERE state='BAD'" to monitor a number of database objects in nonfunctioning state. Such a job may be defined as a SQL query and may be intended to be run in a testing database and production database. In order to enable the job to run in the testing and execution environment, a user may define two environments by defining a variable "databaseHostName" and define one job where databaseHostName="${databaseHostName}". In this example, the environment variable may be host name or IP address of the database that is to be monitored.

By way of further example, a user may monitor the state of a service by causing a HTTP GET call to http://my-service-test.com/serviceState and http://my-service-prod.com/serviceState. To define a single job, the user may set the URL of the service to http://my-service-${stage}.com/serviceState in the job definition, and define two environments, testing and production, each of which defines variable "stage". In this example, the environment variable may take the form of a fragment of URL.

FIG. 5 illustrates another example job environment matrix, in which column 502 shows an example list of jobs and column 504 shows an example environment (in this case, a production environment). For each job 506, the job environment matrix illustrates the name of the job, icons enabling deletion of the job from the matrix (508) and editing of the job (510), a status of the job in each environment, icons enabling the user to start an instance of the job in a specific environment (512), suspend a running instance of the job (514), resume running a job (not shown), or stop an instance of the job in a specific environment (516). When an instance of a job cannot be started in a specific environment, an icon 518 may be presented indicating that a problem exists. In this regard, potential problems may indicate incorrect or missing environment variables or an error in the abstract job parameters used to create the job in the first place. For each environment, an icon 520 enables editing of the environment.

Based on user icon selection, the job environment matrix may be used to issue resource monitoring commands, as shown in FIG. 6. In this regard, in operation 602 the apparatus 300 may include means, such as user interface 302, communications interface 306, or the like, for receiving, using the graphical user interface, instructions to run, stop, suspend running of, or resume running an instance of a job displayed in the job environment matrix in an environment displayed in the job environment matrix. In accordance with this instruction, in operation 604 the apparatus 300 may further include means, such as processor 304, communications interface 306, or the like, for starting, stopping, suspending, or resuming the instance of the job based on the received instructions.

Of course, the graphical user interface may present other interactive capabilities as well. In one embodiment shown in FIG. 7a, embodiments of the present invention enable creation of a new job. For instance, in operation 702 the apparatus 300 may include means, such as user interface 302 or the like, for displaying, using the graphical user interface, a job creation interface. In operation 704, the apparatus 300 may further include means, such as user interface 302 or the like, for receiving, using the graphical user interface, abstract job parameters. In this regard, the abstract job parameters may include an execution schedule of the job and information defining the collector that performs the previously described resource monitoring operations. In operation 706, the apparatus 300 may further include means, such as processor 304 or the like, for creating a new job based on the received abstract job parameters. The apparatus 300 may further include means, such as memory 308 or the like, for storing the new job.

Similarly, as shown in FIG. 7b, the graphical user interface may enable a user to edit an already-created job. The apparatus 300 may include means, such as user interface 302 or the like, for displaying, using the graphical user interface, a job details interface, such as that shown in FIG. 8. As illustrated in FIG. 8, the job details interface displays the abstract job parameters of a selected job. The apparatus 300 may further include means, such as user interface 302 or the like, for receiving, using the graphical user interface, selection of icon 510 to edit a job, or selection of a link on the job details interface. Accordingly, referring now to FIG. 7b, in operation 708 the apparatus 300 may include means, such as user interface 302 or the like, for displaying, using the graphical user interface, a job editing interface, wherein the job editing interface displays abstract job parameters of a selected job.

After displaying the job editing interface, in operation 710 the apparatus 300 may further include means, such as user interface 302 or the like, for receiving, using the graphical user interface, instructions for updating the abstract job parameters of the selected job. Finally, in operation 712, the apparatus 300 may further include means, such as processor 304 or the like, for updating the selected job based on the received instructions. Finally, the apparatus 300 may further include means, such as memory 308 or the like, for storing the updated job.

In addition to creating and editing a job, however, the interface 202 enables creation and editing of specific environments in which the user may wish to execute an instance of the job, as shown in FIGS. 9a and 9b. For instance, as shown in operation 902 of FIG. 9a, the apparatus 300 may include means, such as user interface 302 or the like, for displaying, using the graphical user interface, an environment creation interface. In operation 904, the apparatus 300 may further include means, such as user interface 302 or the like, for receiving, using the graphical user interface, one or more environment variables. In this regard, environment variables may be network addresses of resources to be monitored, or may be any other information that may be unique to a particular environment. In operation 906, the apparatus 300 may further include means, such as processor 304 or the like, for creating a new environment based on the received one or more environment variables. The apparatus 300 may further include means, such as memory 308 or the like, for storing the new environment.

In a similar fashion as editing of created jobs, the graphical user interface may enable a user to edit a created environment. In this regard, the apparatus 300 may include means, such as user interface 302 or the like, for displaying, using the graphical user interface, an environment details interface, that shows the parameters of a selected environment. The apparatus 300 may further include means, such as user interface 302 or the like, for receiving, using the graphical user interface, selection of icon 520 to edit an environment, or selection of a link on the environment details interface. Accordingly, referring now to FIG. 9b, in operation 809 the apparatus 300 may include means, such as user interface 302 or the like, for displaying, using the graphical user interface, an environment editing interface, wherein the environment editing interface displays parameters of the selected job. FIG. 10 illustrates one such example display.

After displaying the environment editing interface, in operation 910, the apparatus 300 may further include means, such as user interface 302 or the like, for receiving, using the graphical user interface, instructions for updating the parameters of the selected environment. In operation 912, the apparatus 300 may further include means, such as processor 304 or the like, for updating the selected environment based on the received instructions. In this regard, the apparatus 300 may store the updated environment in memory 308.

Additionally, the interface 202 may enable a user to view a "Dashboard" overview of the resource monitoring jobs. In this regard, the apparatus 300 may include means, such as user interface 302 or the like, for displaying, using the graphical user interface, a summary of running jobs in conjunction with a status of each of the running jobs. In this regard, FIG. 11 discloses one example dashboard overview, which discloses each running job, the number of retrieved monitoring results collected for each job, information regarding the schedule for each running job, and descriptive information for each listed environment and each listed job.

Embodiments of the present invention further enable the use of "domains" that comprises a model of a team, an organization, an entity under which jobs are grouped and accessed with the same access control list (ACL). Accordingly, domains enable the separation of one set of jobs from another based on a predetermined grouping. In this regard, in each domain, multiple jobs, multiple environments, and a user list are defined. Depending on a user's role, users in the user list may modify environments or jobs in the domain, may modify the domain itself, or may see the passwords and variables in the domain. Within the context of a single company implementing the present invention, every employee in the company may have read-only access to all domains, but not every employee can see variable values or database passwords in a specific domain without membership in that domain.

In this regard, the apparatus 300 may include means, such as memory 308 or the like, for storing a domain having a list of jobs, a list of environments, and permissions information. In some example embodiments, the permissions information indicates a list of users who may access the domain and access levels of the list of users. FIG. 12 shows a data model of one example domain. Each table in FIG. 12 illustrates a discrete element of the domain having the listed set of attributes. For instance, item 1202 indicates the domain element itself, with attributes defining an ID, a name, a description, relevant owner information, and a version. Item 1204 indicates the attributes of any given domain user. Item 1206 indicates the attributes of an environment within a domain, and item 1208 contains environment variables for environment 1206. Similarly, item 1210 indicates a particular job and associated attributes, while items 1212 and 1214 indicate collector information for that particular job. Finally, item 1216 indicates an instance of a job 1210 running in environment 1206, along with its associated attributes.

The interface 202 may enable a user to update the jobs and/or environments in a given domain, as shown in FIG. 13a. For instance, in operation 1302 the apparatus 300 may include means, such as user interface 302 or the like, for displaying, using the graphical user interface, a domain editing interface, wherein the domain editing interface displays the list of jobs and the list of environments of the domain. In operation 1304, the apparatus 300 may further include means, such as user interface 302 or the like, for receiving, using the graphical user interface, instructions for updating the list of jobs or the list of environments. Accordingly, the apparatus 300 thus include means, such as processor 304 or the like, for updating the domain based on the instructions. Finally, in operation 1306, the apparatus 300 may include means, such as memory 308, for storing the updated domain.

Similarly, the interface 202 may enable a user to update the permissions information in a given domain, as shown in FIG. 13b. In this regard, in operation 1308, the apparatus 300 may include means, such as user interface 302 or the like, for displaying, using the graphical user interface, a permissions editing interface, wherein the permissions editing interface displays the list of users who may access the domain and access levels of each user of the list of users. In operation 1310, the apparatus 300 may further include means, such as user interface 302 or the like, for receiving, using the graphical user interface, instructions for updating the list of users and/or the access levels of each user of the list of users. Subsequently, in operation 1312, the apparatus 300 thus include means, such as processor 304 or the like, for updating the domain based on the instructions, and means, such as memory 308, for storing the updated domain.

Host Operations

FIG. 14 illustrates a flowchart containing example operations for managing a monitoring job from the perspective of computer infrastructure 104 (e.g., one or more hosts 106 within the computer infrastructure 104). The operations illustrated in FIG. 14 may, for example, be performed by, with the assistance of, and/or under the control of one or more of a device, such as apparatus 300, and may use processor 304, memory 308, user interface 302, and communications interface 306. In operation 1402, apparatus 300 includes means, such as communication interface 306 or the like, for receiving a communication, created by a job instance, from an interface 202. In this regard, a job instance is created in response to user input via a job environment matrix displayed by the interface 202.

In operation 1404, the apparatus 300 further includes means, such as processor 304 or the like, for determining an environment to which to transmit a query based on the received communication. The determination of the environment may be made based on the environment variables included in the job instance.

In operation 1406, the apparatus 300 may include means, such as communications interface 306 or the like, for transmitting a resource query to a collector located in the determined environment. Similarly, in operation 1408, the apparatus 300 may include means, such as communications interface 306 or the like, for receiving result information from the collector. As shown in FIG. 14, these operations may cycle indefinitely until suspension or stoppage of the corresponding job instance.

Finally, in operation 1410, the apparatus 300 may include means, such as communications interface 306, memory 308, or the like, for storing the result information (in memory 308 or data storage 204), such that it is available for later communication by the interface 202.

Collector Operations

FIG. 15 illustrates a flowchart containing example operations for managing a monitoring job from the perspective of a collector residing in a particular environment having one or more resources. The operations illustrated in FIG. 15 may, for example, be performed by, with the assistance of, and/or under the control of one or more of a device, such as apparatus 300, and may use processor 304, memory 308, user interface 302, and communications interface 306. In operation 1502, apparatus 300 includes means, such as communication interface 306 or the like, for receiving a resource query from an interface 202 via computer infrastructure. In this regard, the resource query is created by a job instantiated using the interface 202.

In operation 1504, the apparatus 300 may include means, such as communications interface 306 or the like, for querying resource identified in the resource query. Similarly, in operation 1506, the apparatus 300 may include means, such as communications interface 306 or the like, for receiving result information from the resource.

Finally, in operation 1508, the apparatus 300 may include means, such as communications interface 306 or the like, for transmitting the result information to the computer infrastructure.

Example: Database Service Availability Monitoring

Consider the example of a promotion and marketing service that presents, via its website, promotions redeemable at merchant establishments throughout the world. In this example, the website of the promotion and marketing service may, based on user traffic, access the promotion database resources. However, because the promotion and marketing service operates worldwide, there are promotion database resources located in a variable of jurisdictions that scale on a constant basis. Furthermore, loss of access to the database would certainly cause economic harm due to the loss of potential revenue from users visiting the company website. Accordingly, the promotion and marketing service develops a job to monitor the service availability of a database, and intends to deploy it to monitor each of the promotion databases it operates around the world.

As previously discussed, this process would historically have required the individual development of a resource monitor for each of the various promotion databases, which would accordingly have to be tailored more specifically for each specific deployment. However, using an embodiment of the present invention, the promotion and marketing service creates a job for monitoring a database, and creates environments with environment variables specifying the specific network address of each database to be monitored.

Accordingly, using interface 202, an operator (such as a user or a local computing device) starts, using a job environment matrix of the interface 202, instances of the created job to monitor all of the promotion databases globally. Starting each job instance causes a communication to be transmitted, via computer infrastructure 104, to a respective collector within the corresponding environment. The collector queries the promotion database in the environment for service status, and transmits results of the query to the interface 202 via the computer infrastructure 104. Based on a predefined execution schedule, the job is able to periodically query the promotion database and ensure its continued service availability, or alternatively quickly identify a problem. Accordingly, using an embodiment of the present invention, the promotion and marketing service is able to efficiently and effectively monitor promotion databases in a distributed network.

As described above, certain example embodiments of the present invention may provide host-independent resource monitoring for distributed networks. Using embodiments of the present invention, resource monitors can be implemented in a variety of computing environments by defining particular environment variables using which the instantiate generalized monitoring jobs. Moreover, users can intuitively control a variety of jobs in a variety of environments using an intuitive graphical user interface, as described above. As a result, resource monitors can be quickly and efficiently employed in a variety of computer environments.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory, the memory storing computer program code that, when executed by the processor, causes the apparatus to:
   receive, via a user interface, a communication from a resource monitoring job instance, wherein the resource monitoring job instance is designed for monitoring a resource within a distributed network, wherein the distributed network is subjected to varying peak user traffic periods and network resource capacities;
   identify an environment within the distributed network that is related to the received communication;
   transmit a resource query to a collector located in the identified environment;
   receive result information from the collector located in the identified environment; and
   store the result information for subsequent communication via the user interface.

2. The apparatus of claim 1, wherein the resource query comprises a first resource query and wherein the result information comprises first result information, and wherein the computer program code, when executed by the processor, further causes the apparatus to:
   transmit a second resource query to the collector located in the identified environment;
   receive second result information from the collector located in the identified environment; and
   store the second result information for subsequent communication via the user interface.

3. The apparatus of claim 1, wherein the computer program code, when executed by the processor, further causes the apparatus to:
   identify the resource query transmitted to the collector based on a resource monitoring job identified in the communication,
   wherein the resource monitoring job defines actions to be performed and an execution schedule for monitoring the resource within the distributed network.

4. The apparatus of claim 1, wherein identifying the environment within the distributed network that is related to the received communication is based on environment variables included in the resource monitoring job instance.

5. The apparatus of claim 1, wherein the computer program code, when executed by the processor, further causes the apparatus to:
   cause the user interface to display the result information.

6. The apparatus of claim 5, wherein causing the user interface to display the result information includes:
   causing the user interface to display the result information in a designated communication format.

7. The apparatus of claim 5, wherein causing the user interface to display the result information includes:
   causing the user interface to display the result information in an instance in which characteristics of the result information indicate a predefined circumstance of the resource.

8. A method comprising:
   receiving, via a user interface, a communication from a resource monitoring job instance, wherein the resource monitoring job instance is designed for monitoring a resource within a distributed network, wherein the distributed network is subjected to varying peak user traffic periods and network resource capacities;
   identifying an environment within the distributed network that is related to the received communication;
   transmitting a resource query to a collector located in the identified environment;
   receive result information from the collector located in the identified environment; and
   storing the result information for subsequent communication via the user interface.

9. The method of claim 8, wherein the resource query comprises a first resource query and wherein the result information comprises first result information, and wherein the method further comprises:
    transmitting a second resource query to the collector located in the identified environment;
    receiving second result information from the collector located in the identified environment; and
    storing the second result information for subsequent communication via the user interface.

10. The method of claim 8, further comprising:
    identifying the resource query transmitted to the collector based on a resource monitoring job identified in the communication,
    wherein the resource monitoring job defines actions to be performed and an execution schedule for monitoring the resource within the distributed network.

11. The method of claim 8, wherein identifying the environment within the distributed network that is related to the received communication is based on environment variables included in the resource monitoring job instance.

12. The method of claim 8, further comprising:
    causing the user interface to display the result information.

13. The method of claim 12, wherein causing the user interface to display the result information includes:
    causing the user interface to display the result information in a designated communication format.

14. The method of claim 12, wherein causing the user interface to display the result information includes:
    causing the user interface to display the result information in an instance in which characteristics of the result information indicate a predefined circumstance of the resource.

15. A computer program product comprising a non-transitory computer-readable storage medium storing computer program code that, when executed by an apparatus, causes the apparatus to:
    receive, via a user interface, a communication from a resource monitoring job instance, wherein the resource monitoring job instance is designed for monitoring a resource within a distributed network, wherein the distributed network is subjected to varying peak user traffic periods and network resource capacities;
    identify an environment within the distributed network that is related to the received communication;
    transmit a resource query to a collector located in the identified environment;
    receive result information from the collector located in the identified environment; and
    store the result information for subsequent communication via the user interface.

16. The computer program product of claim 15, wherein the resource query comprises a first resource query and wherein the result information comprises first result information, and wherein the computer program code, when executed by the apparatus, further causes the apparatus to:
    transmit a second resource query to the collector located in the identified environment;
    receive second result information from the collector located in the identified environment; and
    store the second result information for subsequent communication via the user interface.

17. The computer program product of claim 15, wherein the computer program code, when executed by the apparatus, further causes the apparatus to:
    identify the resource query transmitted to the collector based on a resource monitoring job identified in the communication,
    wherein the resource monitoring job defines actions to be performed and an execution schedule for monitoring the resource within the distributed network.

18. The computer program product of claim 15, wherein identifying the environment within the distributed network that is related to the received communication is based on environment variables included in the resource monitoring job instance.

19. The computer program product of claim 15, wherein the computer program code, when executed by the apparatus, further causes the apparatus to:
    cause the user interface to display the result information.

20. The computer program product of claim 19, wherein causing the user interface to display the result information includes:
    causing the user interface to display the result information in a designated communication format.

* * * * *